United States Patent
Wu et al.

(10) Patent No.: US 12,405,779 B2
(45) Date of Patent: Sep. 2, 2025

(54) ONTOLOGY-BASED MULTI-PROGRAMMING LANGUAGE COMPONENT SPECIFICATIONS AND WORKFLOW SYSTEM AND USE METHOD

(71) Applicant: Institute of Medical Information, Chinese Academy of Medical Sciences, Beijing (CN)

(72) Inventors: Sizhu Wu, Beijing (CN); Qing Qian, Beijing (CN); Shengyu Liu, Beijing (CN); Xiaolei Xiu, Beijing (CN); Anran Wang, Beijing (CN)

(73) Assignee: Institute of Medical Information, Chinese Academy of Medical Sciences, Beijing (CN)

( * ) Notice: Subject to any disclaimer, the term of this patent is extended or adjusted under 35 U.S.C. 154(b) by 0 days.

(21) Appl. No.: 18/641,383

(22) Filed: Apr. 21, 2024

(65) Prior Publication Data

US 2025/0156165 A1  May 15, 2025

(30) Foreign Application Priority Data

Nov. 13, 2023 (CN) .......... 202311499735.9

(51) Int. Cl.
  *G06F 8/51*  (2018.01)
  *G06F 8/41*  (2018.01)
(52) U.S. Cl.
  CPC . *G06F 8/51* (2013.01); *G06F 8/41* (2013.01)
(58) Field of Classification Search
  CPC ............ G06F 8/34; G06F 8/41; G06F 8/4452
  See application file for complete search history.

(56) References Cited

U.S. PATENT DOCUMENTS 11,748,634 B1 * 9/2023 Kulkarni ............... G06F 18/21
  707/722
2003/0004770 A1  1/2003 Miller et al.
  (Continued)

FOREIGN PATENT DOCUMENTS

CN   101183308 A   5/2008
CN   113826070 A   12/2021

*Primary Examiner* — Duy Khuong T Nguyen
(74) *Attorney, Agent, or Firm* — Bayramoglu Law Offices LLC

(57) ABSTRACT

Disclosed are an ontology-based multi-programming language component specifications and workflow system and a use method. A multi-language programming component manager is connected with a multi-language programming component workflow design modeler and a multi-programming language transformation engine. A core workflow engine is connected with the multi-language programming component workflow design modeler and the multi-programming language transformation engine. An ontology that supports normalized management of multi-programming language transformation and components is designed to standardize the definition of core components, support multi-programming language data conversion communication and component management, support custom design creation, flexible expansion and result interaction of multi-class workflow components, make full use of advantages of various programming languages, and reduce technical difficulties in the applicability of components developed in various programming languages; while achieving the maximum use of multi-programming languages to achieve the effect of "1+1>2".

8 Claims, 5 Drawing Sheets

(56) References Cited

U.S. PATENT DOCUMENTS

| | | | |
|---|---|---|---|
| 2013/0081004 A1* | 3/2013 | Vargas | G06F 8/51 |
| | | | 717/137 |
| 2016/0012350 A1* | 1/2016 | Narayanan | G06F 9/4484 |
| | | | 706/12 |
| 2019/0341133 A1* | 11/2019 | Harding | G16H 10/60 |
| 2022/0138004 A1* | 5/2022 | Nandakumar | G06N 5/01 |
| | | | 718/102 |
| 2022/0261631 A1* | 8/2022 | Cohen | G06N 20/00 |
| 2023/0108808 A1* | 4/2023 | Lerman | G06N 5/01 |
| | | | 717/104 |
| 2024/0111502 A1* | 4/2024 | Good | G06F 3/04842 |

* cited by examiner

ONTOLOGY-BASED MULTI-PROGRAMMING LANGUAGE COMPONENT SPECIFICATIONS AND WORKFLOW SYSTEM AND USE METHOD

CROSS REFERENCE TO THE RELATED APPLICATIONS

This application is based upon and claims priority to Chinese patent application No. 202311499735.9, filed on Nov. 13, 2023, the entire contents of which are incorporated herein by reference.

TECHNICAL FIELD

The present disclosure relates to the field of computer technology, and particularly to an ontology-based multi-programming language component specifications and workflow system and a use method.

BACKGROUND

Currently, scientific data platforms or data analysis platforms support workflow patterns of functional component assembly for data analysis and mining. However, common platforms available at present only support the assembly and development of workflows with components written in a single programming language. Different programming languages, such as Python, Java and R, have developed some mature toolkits, and each has its own advantages. For example, Java excels in handling large amounts of data collection, processing, and high-concurrency operations. Python is suitable for machine learning and data processing, offering a rich set of third-party libraries and frameworks. R has advantages in data statistical analysis and visualization, and if applications can be flexibly combined, functional features of the programming languages can be better leveraged to achieve data mining and analysis goals. However, in actual data analysis tasks, users often find themselves restricted to using data analysis platforms based on their familiarity with particular programming languages. Existing tools or components cannot support the flexible assembly of components written in multi-programming languages, and lack standardized definition and management of components, resulting in the inability to choose the best programming language components to build workflow nodes for achieving the optimal data mining and analysis practices. In addition, scientific data platforms are mostly constructed for no-code/low-code workflows, for which the component libraries are pre-packaged and set, being unable to meet the customization, development and editing modification requirements of data analysis processes during workflow design and implementation.

Therefore, those skilled in the prior art are in an urgent need to solve the above problems.

SUMMARY

In view of the foregoing problems, the present disclosure provides an ontology-based multi-programming language component specifications and workflow system and a use method to solve the problems in the background art.

In order to achieve the above objective, the present disclosure adopts the following technical solution:

In one aspect, the present disclosure provides an ontology-based multi-programming language component specifications and workflow system, including a multi-language programming component manager, a multi-language programming component workflow design modeler, a multi-programming language transformation engine and a core workflow engine; the multi-language programming component manager is connected with the multi-language programming component workflow design modeler and the multi-programming language transformation engine; and the core workflow engine is connected with the multi-language programming component workflow design modeler and the multi-programming language transformation engine;

the multi-language programming component manager encapsulates, presets, organizes, manages and stores multi-type and multi-programming language components in a platform;

the multi-language programming component workflow design modeler supports design and construction of a workflow model;

when performing data communication across components in different programming languages, the multi-programming language transformation engine converts and maps data types and parameters required by the components from the data types of one programming language to data types of another programming language according to requirements; and the core workflow engine coordinates multiple node tasks of different programming/same programming language components and their data dependencies.

Optionally, the multi-language programming component manager is further connected with an online code development compiler; and the online code development compiler supports the user to develop and write codes, to re-edit and modify component codes in a well-built workflow assembly, and to support customization of components.

Optionally, the core workflow engine is further connected with a workflow running manager, and the workflow running manager monitors and manages usage and consumption of resources in real time.

Optionally, the multi-language programming component workflow design modeler includes component classification libraries, design modeling panels, component information presentation and parameter configuration windows, running consoles and data views; the component classification libraries contain encapsulated components and perform functional classification; the design modeling panels are visual graphical process model design tools, which support multi-programming language workflow modeling through the design modeling panels, and support creation of workflow nodes by operating the components through a drag-and-drop method, and for each component dragged into the design modeling panels, metadata information about corresponding components can be viewed through the component information presentation and parameter configuration windows; the component information presentation and parameter configuration windows each provides a standardized metadata definition for each component, including component name, component description, programming language, component use method, component classification, component version, and component parameter description; the data views are used to present workflow data sources and data results; and the running consoles present running results, tasks status and log records.

Optionally, the multi-programming language transformation engine includes a normalized multi-programming language transformation and component ontology, and the normalized multi-programming language transformation and component ontology is used to define component specifications, and support the standardized component creation, component validity check, component instance organization, component lifecycle management and storage; and the normalized multi-programming language transformation and component ontology includes programming languages, interface standards, data types, component types, language transformation, data storage, identifiers, online coding, files, states, algorithm models, virtual environments, resource configuration, licenses and versions; the programming languages are an extensible class of programming languages, including Java, R and Python languages; the interface standards are used for component output ranges, input range and filter value; the language transformation involves inputted parameters and outputted parameters; range types are used for normalizing communication data types, including but not limited to characters, numbers, Booleans and lists; the resource configuration refers to conditions for running of software and hardware resources; the component classification refers to a classification of component functions in a data science platform, including data reading, data preprocessing, text analysis, feature engineering, machine learning models, machine learning training and visualization; the data storage refers to the storage of component-related type data; the versions are versions of the recorded components; the licenses are maintained to ensure compliance of the use of all components; the states are the lifecycle of the components, including creation, running, encapsulation, release, undoing, updating and deleting; and the identifiers are unique identifications that record the components.

Optionally, the core workflow engine includes a workflow node scheduling module, a workflow node management module, a workflow instantiation module, a workflow optimization management module, a workflow process control module and a workflow monitoring management module; and the workflow node management module is used for implementing node component management in the workflow model; the workflow node scheduling module is used for loading and scheduling component nodes in a multi-language programming component library according to the workflow model; the workflow instantiation module is mainly used for executing and implementing data tasks according to the workflow model designed and constructed; the workflow process control module is used for implementing startup, execution and end of a workflow according to execution logic and sequence; the workflow optimization management module is used for generating strategies for optimizing execution logic during workflow execution; and the workflow monitoring management module is used for implementing log records and monitoring during operation of the workflow, and monitoring process status, task progress and abnormalities of the workflow.

Optionally, in the multi-language programming component workflow design modeler, node types available for workflow modeling are defined as follows:

start node: can only be used at the beginning of the workflow, any nodes in front of the start node are not allowed, but nodes can be connected after the start node;

end node: can only be used at the end of the workflow, nodes in front of the end note are allowed, but any nodes after the end node are not allowed;

merging node: an entry is connected to at least two nodes, and an exit is connected to only one node;

diverging node: only one node entry is provided, but at least two nodes are provided as the node exits;

diverging and merging node: at least two node entries and node exits are respectively provided; and common node: only one entry node and one exit node are respectively provided.

Optionally, control over a workflow process by the core workflow engine includes a workflow start control, a workflow end control, a workflow execution control, a multi-programming language conversion engine calling and a task component execution control:

the workflow start control is a task control executed by a workflow start node, and is used for controlling initiation of a multi-programming language component workflow, where start rules and start time can be configured, and after the workflow start node is started, the system will automatically create a virtual container required by multi-programming language components, and automatically configure optimal CPU and GPU parameters according to hardware conditions;

the workflow end control is a task control executed by a workflow end node, and is used for controlling the end of a multi-programming language hybrid workflow and recycling of the virtual container. When the workflow task executes node control, the system will automatically recycle virtual container created by the multi-programming language components, and release a hard disk, memory and CPU resources;

the workflow execution control includes a serial mode and a parallel mode; the serial mode executes connected nodes in sequence; in the parallel mode, nodes at a same branch can be executed simultaneously; when the workflow has a plurality of lines, the workflow can simultaneously execute each branch in parallel according to the execution logic; when executing different programming language nodes, the workflow runs in parallel under different environment controllers, and when executing tasks at a same programming language node, the workflow starts multi-threading mode processing to quickly respond to different execution tasks; during execution, it is ensured that a merging node can be executed only after all entry nodes of the merging node are executed; and execution of each workflow component node is performed by a controller in strict accordance with data input and output specifications, results will be returned upon completion of the execution, and a program then continues to execute the next node.

The multi-programming language conversion engine calling is logical rule determination between circulation flow of workflow nodes and task components, and multi-programming language task components have pre-conditions and post-conditions. Different pre-conditions and post-conditions exist in various data processing and mining analysis scenarios, and logical rules are configured on a workflow node connection line; and small data instance pre-tests are performed automatically before the workflow is executed, process performance and efficiency of each component are calculated, and thresholds are set to optimize an execution strategy; and the task component execution control ensures that each component strictly abides by component input rules and output rules, and the system automatically records detailed log information.

In another aspect, the present disclosure provides a use method of the ontology-based multi-programming language component specifications and workflow system, including:

step 1: constructing data reading components and data preprocessing analysis components by using Java language, where data reading is a fixed start node; constructing machine learning classification algorithm components by using Python language, where the machine learning classification algorithm components are all common nodes or diverging and merging nodes; and constructing data visualization analysis components by using R language, where the data visualization analysis components are all end nodes;

step 2: independently selecting and taking analysis data as input items, and connecting the data reading components, the machine learning classification algorithm components and the data visualization analysis components used in a data preparation process to form a workflow form of multi-language components in serial assembly;

step 3: using a core workflow engine to adjust and acquire a component access sequence, and calling a multi-programming language transformation engine to determine and identify allocation, conversion and control of inputted and outputted parameters of the components;

step 4: redefining a data structure of inputted and outputted files of components in different languages in a workflow through the step 3 according to input parameter rules and output parameter rules, and generating a unified data structure and component configuration of multi-programming languages;

step 5: after implementing the unified data structure and component configuration of multi-programming languages through the core workflow engine, providing a unified calling interface for Java language, Python language, R language and other languages; and step 6: after the processing in the step 5 is completed, the core workflow engine uniformly outputs execution results of the workflow according to the output parameter rules, and feeds back to a workflow result display, such that actual execution results of the workflow formed by combining the multi-programming languages are displayed.

It can be seen from the above technical solutions that compared with the prior art, the present disclosure provides an ontology-based multi-programming language component specifications and workflow system and a use method, including a multi-language programming component manager, a multi-language programming component workflow design modeler, a multi-programming language transformation engine and a core workflow engine; the multi-language programming component manager is connected with the multi-language programming component workflow design modeler and the multi-programming language transformation engine; the core workflow engine is connected with the multi-language programming component workflow design modeler and the multi-programming language transformation engine; an ontology that supports normalized management of multi-programming language transformation and components is designed to standardize the definition of core components, support multi-programming language data conversion communication and component management, support multi-class workflow components (components with different functions, low-code/no-code components, the online code development compiler, and the like) custom design creation, flexible expansion and result interaction, make full use of advantages of various programming languages, and reduce technical difficulties in the applicability of components developed in various programming languages; while achieving the maximum use of multi-programming languages to achieve the effect of "1+1>2", the present disclosure can realize flexible assembly of code-free and code development component workflows to achieve the goal of diverse data processing and mining analysis tasks.

BRIEF DESCRIPTION OF THE DRAWINGS

In order to more clearly illustrate the technical solution in embodiments of the present disclosure or in the prior art, a brief introduction to the accompanying drawings required for the description of the embodiments or the prior art will be provided below. Obviously, the accompanying drawings in the following specification are merely embodiments of the present disclosure. Those of ordinary skill in the art would also derive other accompanying drawings from these accompanying drawings without making inventive efforts.

DETAILED DESCRIPTIONS OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All the other embodiments obtained by those of ordinary skill in the art based on the embodiments in the present disclosure without creative efforts shall fall within the scope of protection of the present disclosure.

Figure 1:
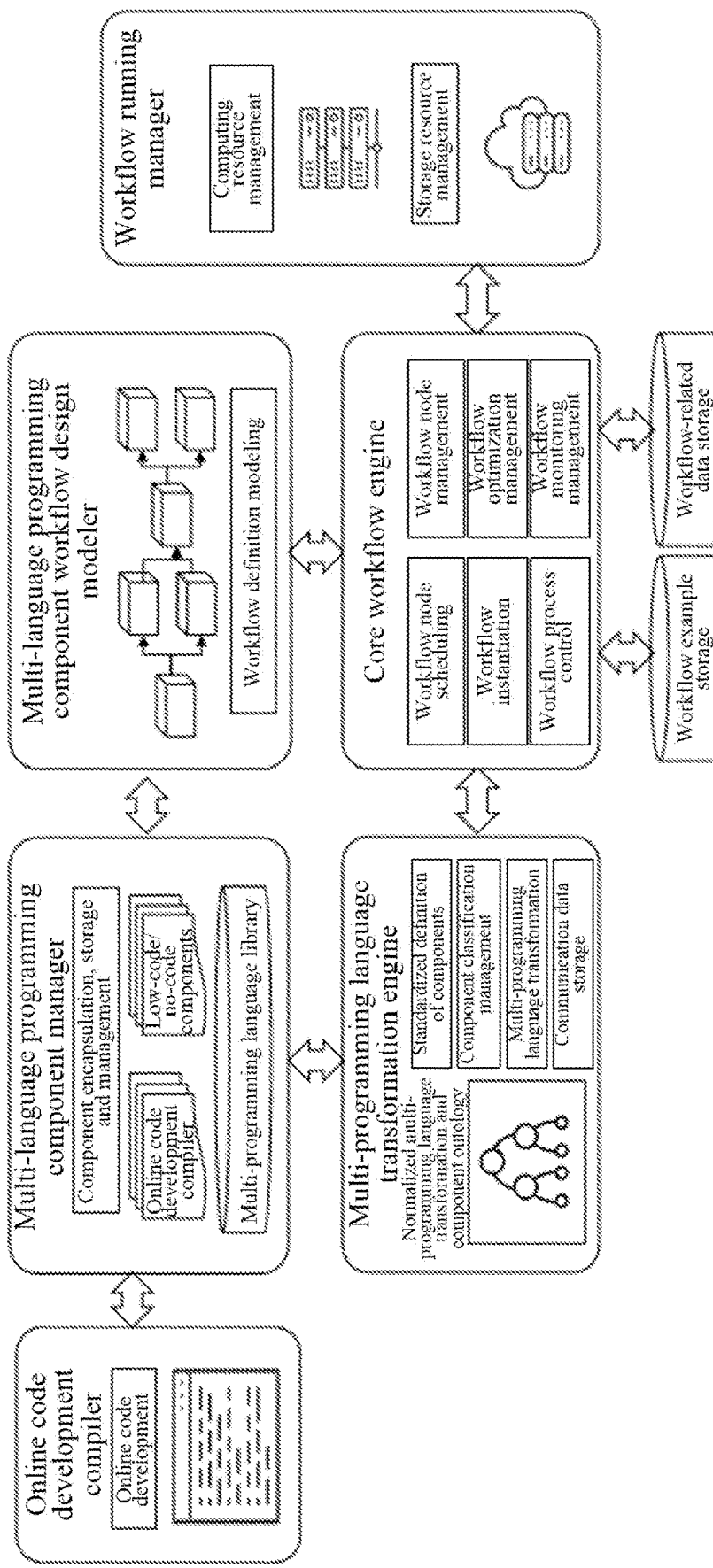
FIG. 1 is a structural schematic diagram of a system provided in the present disclosure.

Embodiments of the present disclosure disclose an ontology-based multi-programming language component specifications and workflow system, as shown in FIG. 1, including a multi-language programming component manager, a multi-language programming component workflow design modeler, a multi-programming language transformation engine and a core workflow engine; the multi-language programming component manager is connected with the multi-language programming component workflow design modeler and the multi-programming language transformation engine; and the core workflow engine is connected with the multi-language programming component workflow design modeler and the multi-programming language transformation engine;

the multi-language programming component manager encapsulates, presets, organizes, manages and stores multi-type and multi-programming language components in a platform;

the multi-language programming component workflow design modeler supports design and construction of a workflow model;

when performing data communication across components in different programming languages, the multi-programming language transformation engine converts and maps data types and parameters required by the components from the data types of one programming language to data types of another programming language according to requirements; and the core workflow engine coordinates multiple node tasks of different programming/same programming language components and their data dependencies.

Components in a data science platform are generally codes or software tools with independent functions or multiple functions using the same programming language. In the present disclosure, not only components in various programming languages are extended, but also an online code development compiler is designed to be added. The components are more flexible in definition, and are editable components that support pure code development in multi-programming languages. In workflow construction, the components can be run independently as a workflow or multiple components can be assembled into a workflow that runs in the same programming language or a mixture of different programming languages to implement specific functions.

The multi-language programming component manager mainly encapsulates, presets, organizes, manages and stores multi-type and multi-programming language components in a platform. The components include pre-packaged components in a system, and application codes of the components and all relevant dependency libraries and frameworks are packaged and encapsulated in a virtualized container Docker to form microservices. When running, each microservice uses a lightweight communication mechanism, such as RESTful API, in its own process, and the services are independent of each other. In addition to no-code/low-code components, the multi-language programming component manager provides an extensible class of components that support custom multi-language online code development compiler to facilitate flexible expansion of functions and to meet customized component requirements of a user. The online code development compiler supports the user to develop and write codes in an online code development compiler, the component codes can be re-edited and modified in a constructed workflow assembly, and customization of components is supported. The online code development compiler has a set of independent operating environment and managed operating framework, which can no longer be encapsulated as components. Therefore, in the present disclosure, it is necessary to first complete the communication with the managed operating framework through the development of Java-based external programs, schedule the online coding execution within the frameworks through the parameter transmission, instruction execution and result feedback, and a RESTful interface service is encapsulated by the Java end. As a result, no-code components and code-based online code development compiler with different functions and programming languages are encapsulated into a RESTful interface with a unified structure, which can be assembled and executed in the same workflow. In the multi-language programming component manager, the no-code/low-code encapsulated components and online code development compiler interfaces are defined, and encapsulated constraints, inspection specifications and organizational classifications are also specified.

In a specific embodiment, the multi-language programming component manager is further connected with the online code development compiler; and the online code development compiler supports the user to develop and write codes in the online code development compiler, to re-edit and modify component codes in a well-built workflow assembly, and to support customization of components.

In a specific embodiment, the core workflow engine is further connected with a workflow running manager, and the workflow running manager monitors and manages usage and consumption of resources in real time.

In a specific embodiment, the multi-language programming component workflow design modeler includes component classification libraries, design modeling panels, component information presentation and parameter configuration windows, running consoles and data views; the component classification libraries contain encapsulated components and perform functional classification; the design modeling panels are visual graphical process model design tools, which support multi-programming language workflow modeling through the design modeling panels, and support creation of workflow nodes by operating the components through a drag-and-drop method, and for each component dragged into the design modeling panels, metadata information about corresponding components can be viewed through the component information presentation and parameter configuration windows; the component information presentation and parameter configuration windows each provides a standardized metadata definition for each component, including component name, component description, programming language, component use method, component classification, component version, and component parameter description; the data views are used to present workflow data sources and data results; and the running consoles present running results, tasks status and log records.

In a specific embodiment, when performing data communication across components in different programming languages, the multi-programming language transformation engine converts and maps data types and parameters required by the components from the data types of one programming language to data types of another programming language according to requirements, such that the workflow can be ran healthily and task goals can be achieved. Since different programming languages have different data type systems and representation methods, in a multi-programming language environment, type conversion needs to be performed through the constructed normalized multi-programming language transformation and component ontology, so as to ensure that data can be properly transferred and processed among different programming languages. When the multi-language type conversion is performed, consideration needs to be given to type compatibility relationships among multiple languages.

Figure 3:
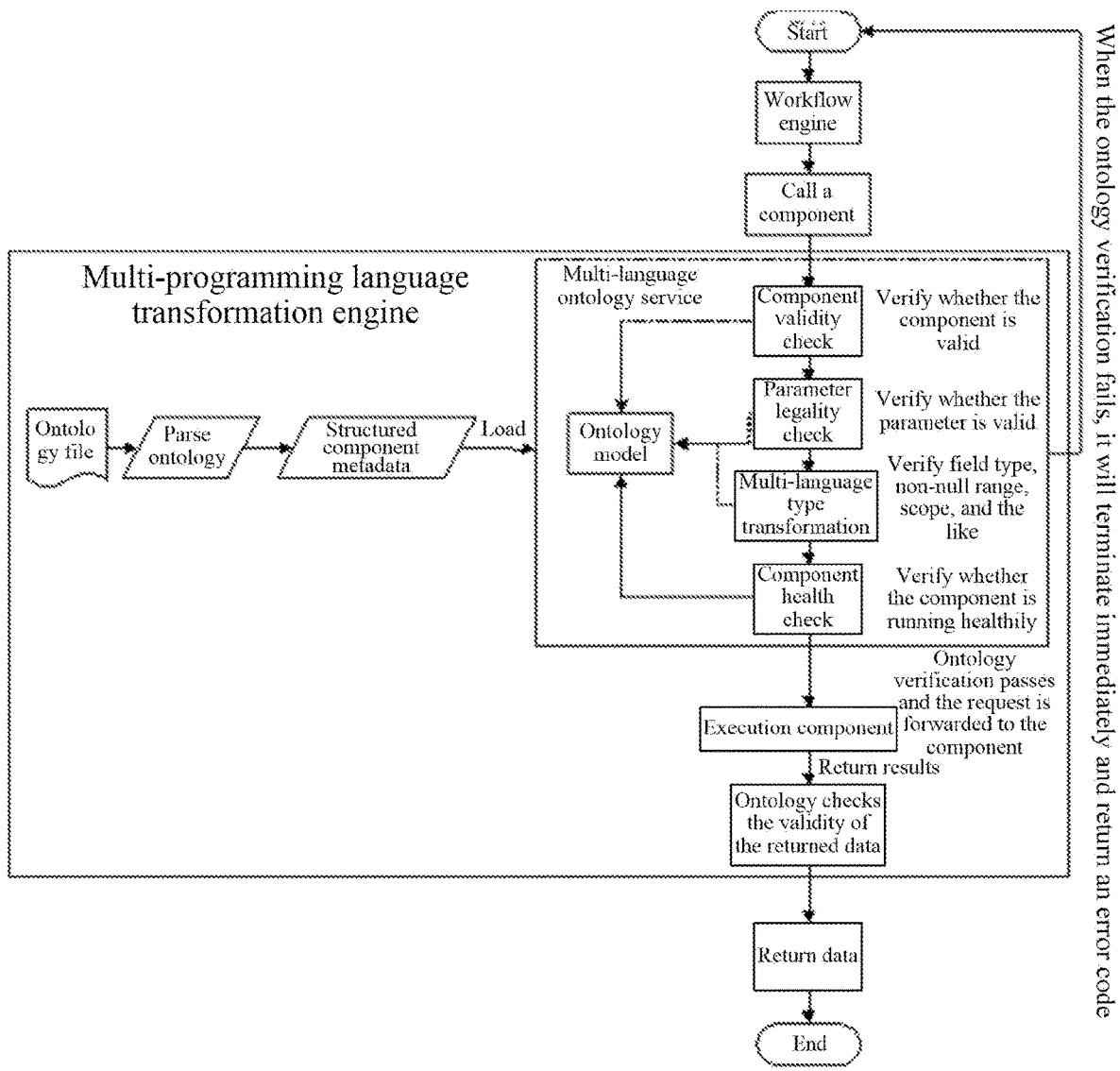
FIG. 3 is a workflow diagram of a multi-programming language transformation engine provided in the present disclosure.

The multi-programming language transformation engine includes the normalized multi-programming language transformation and component ontology, and the normalized multi-programming language transformation and component ontology is used to define component specifications, and support the standardized component creation, component validity check, component instance organization, component lifecycle management and storage; and A workflow of the multi-programming language transformation engine is shown in FIG. 3. When the core workflow engine starts work, components are called to determine whether the multi-programming language workflow is executed to two different programming language nodes. The components in the loaded workflow are started, a request is sent first, consideration is given to determine a component already exists according to the corresponding programming languages obtained from the ontology, and when the component already exists, the component validity check will be started to determine whether the component is legitimate. The components (interfaces) have multiple states, including creation, running, release, undoing, updating, deleting, and the like. The system needs to determine whether a component provides services based on the state of each component. After the component validity check passes, the parameter validity testing of the component is performed to check whether the demand parameters are consistent with the required parameters, and when they are consistent, parameter rules (including necessity, completeness, range legality, and the like) are obtained. Data type conversions of different programming languages are performed according to the differences in different programming language components. Finally, a health check is performed on the components to ensure effectiveness of the components. After verification passes, the request is forwarded to the components. The components are executed, and validity results and data are returned. When an illegal request or an illegal parameter inputting occurs during each verification, an exception message will pop up, and the system will capture the exception message and obtain an understandable content feedback result from the problem library according to information classification. When being called, ontology files are parsed and data are loaded.

In the process of building the multi-programming language workflow, when two or more nodes are involved, such as merging nodes, diverging nodes, and diverging and merging nodes, the nodes are the components developed with different programming languages to implement different functions. Data communication and connections among different programming language nodes are the key to workflow operation. Unlike building a workflow with a single programming language component, data communication among nodes requires conversion and mapping of data types between specific programming languages. In the present disclosure, the construction of the normalized multi-programming language transformation and component ontology mainly aims to implement a normalized definition of components; mapping and type conversion of inputted/outputted data among multi-programming languages; component class management and instance storage of storage component interface.

Concept classes designed in the normalized multi-programming language transformation and component ontology include programming languages, interface standards, data types, component types, language transformation, data storage, identifiers, online coding, files, states, algorithm models, virtual environments, resource configuration, licenses, versions, and the like. In the ontology, some hierarchies and relationships between secondary classes and classes are further established. The programming languages are an extensible class of programming languages, including but not limited to Java, R, Python and the like. The interface standards are mainly used for component output ranges, input range, filter value, and the like. The language transformation mainly involves inputted parameters and outputted parameters. Range types are used for normalizing communication data types, including but not limited to characters, numbers, Booleans, lists, and the like, and examples of data type differences in multi-programming languages are shown in Table 1.

TABLE 1

Examples of Data Type Differences in Multi-programming Languages

| Data Type | Java Language | Python Language | R Language | Other Languages |
|---|---|---|---|---|
| Numbers | Int, Long, Double | Numbers | Double, Integer | ... |
| Booleans | Boolean | Boolean | Boolean | ... |
| Characters | Char, String ( | String | Char | ... |
| List | List | List | List | ... |
| Others | ... | ... | ... | ... |

Figure 2:
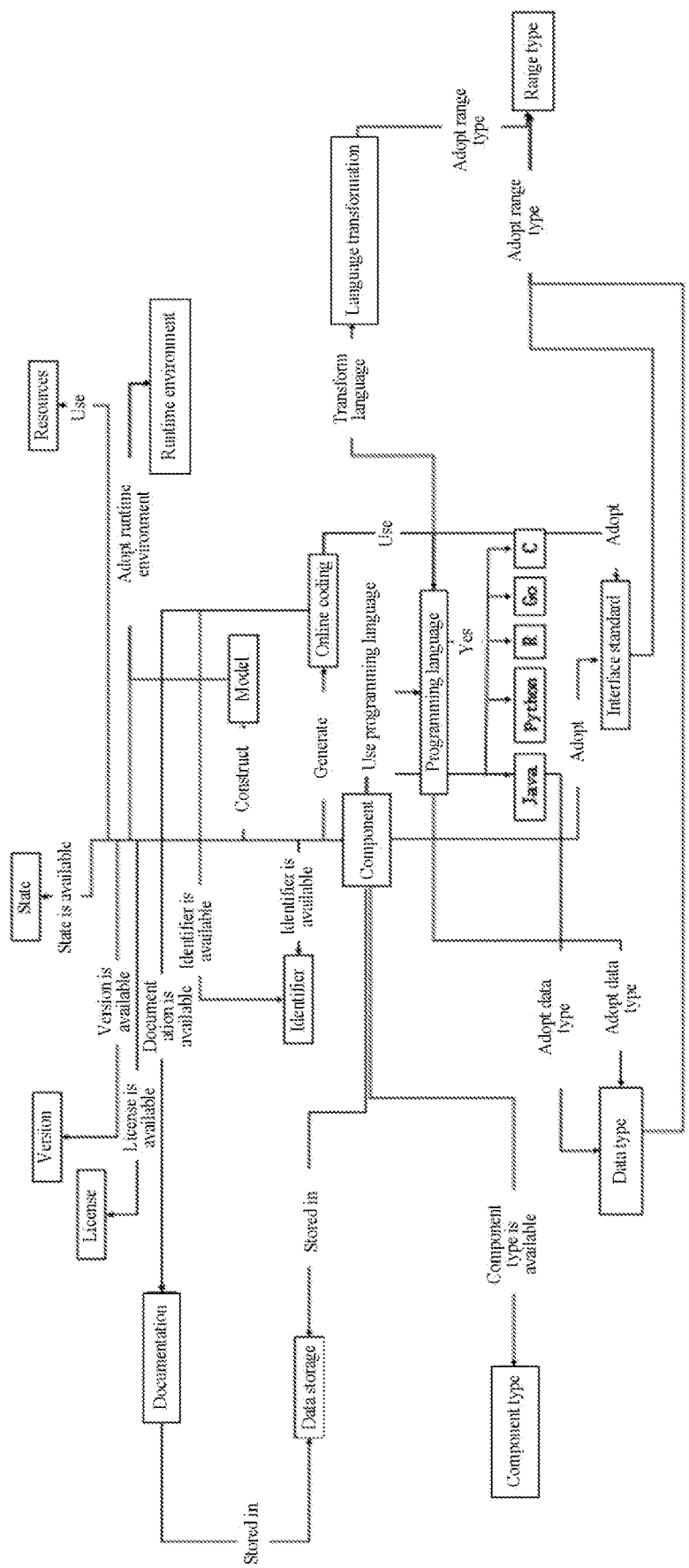
FIG. 2 is a structural schematic diagram of a normalized multi-programming language transformation and component ontology provided in the present disclosure.

The resource configuration refers to conditions for running of software and hardware resources. The component classification refers to a classification of component functions in a data science platform, including but not limited to data reading, data preprocessing, text analysis, feature engineering, machine learning models, machine learning training, visualization, and the like, and the component classification can be extended as needed. The data storage refers to the storage of component-related type data. The versions are versions of the recorded components. The licenses are the licenses of components that need to be recorded and maintained to ensure compliance of the use of all components, because the components may be packaged by open source tools. The states are the lifecycle of the components, including creation, running, encapsulation, release, undoing, updating, deleting, and the like. The identifiers are unique identifications that record the components. In addition to the isA hierarchical relationship, relationship definitions in the ontology further include hasStoredIn, hasUnitType, hasLicense, hasStatus, hasVersion, hasRuntimeEnvironment, hasFile, hasIdentifier, isGeneratedBy, hasDatatype, ConformsTo, Uses, hasLanguageTrans, hasFieldType, hasFieldType, and the like. Specifically, main entity classes and relationships are shown in FIG. 2.

The ontology is used to define component specifications (such as data type, data scope, data accuracy, data constraints, data coding format requirements, and license information) in the present disclosure, and to support the standardized component creation, component validity check, component instance organization, component lifecycle management and storage. The use of ontology facilitates the extension of components in different programming languages and improves the standardization and interoperability of the components.

In a specific embodiment, the core workflow engine includes a workflow node scheduling module, a workflow node management module, a workflow instantiation module, a workflow optimization management module, a workflow process control module and a workflow monitoring management module; and a core workflow is a multi-step process that precisely describes the process of data processing or mining analysis, and coordinates multiple node tasks of different programming/same programming language components and their data dependencies. The workflow engine includes a workflow node scheduling module, a workflow node management module, a workflow instantiation module, a workflow optimization management module, a workflow process control module and a workflow monitoring management module; and the workflow engine mainly performs scheduling interaction with the multi-language programming component workflow design modeler, the multi-language programming component manager and the multi-programming language transformation engine to realize component node calling, data communication, process management and workflow lifecycle status (including startup, execution, optimization, release, and the like). The workflow node management module is mainly used for implementing node component management in the workflow model. The workflow node scheduling module is used for loading and scheduling component nodes in a multi-language programming component library according to the workflow model. The workflow instantiation module is mainly used for executing and implementing specific data tasks according to the workflow model designed and constructed. The workflow process control module is mainly used for implementing the control management of startup, execution and end of a workflow according to execution logic and sequence; and the workflow optimization management module is mainly used for generating strategies for optimizing execution logic during workflow execution, so as to improve the efficiency of workflow execution. The workflow monitoring management module is mainly used for implementing log records and monitoring during operation of the workflow, and monitoring process status, task progress and abnormalities of the workflow. In the present disclosure, each workflow provides the data pre-execution of an instance, which is used for evaluating the workflow execution time and generating execution optimization strategies, so as to avoid the situation that no feedback is given for a long time of period due to excessive processing data or poor component performance.

In a specific embodiment, components in a workflow of multi-programming language data processing or analysis are component units of the workflow, and also task nodes executed in a multi-programming language hybrid workflow (for example, a workflow is assembled by components in different languages, such as Python language and R language, so as to achieve functional goals of the process). The workflow is a directed acyclic graph, nodes in the workflow are defined by different types, and each node can be a different functional type, a multi-programming language, and no-code or online code development compiler. In the multi-language programming component workflow design modeler, node types available for workflow modeling are defined as follows:

start node: can only be used at the beginning of the workflow, any nodes in front of the start node are not allowed, but nodes can be connected after the start node;

end node: can only be used at the end of the workflow, nodes in front of the end note are allowed, but any nodes after the end node are not allowed;

merging node: an entry is connected to at least two nodes, and an exit is connected to only one node;

diverging node: only one node entry is provided, but at least two nodes are provided as the node exits;

diverging and merging node: at least two node entries and node exits are respectively provided; and common node: only one entry node and one exit node are respectively provided.

In a specific embodiment, control over a workflow process by the core workflow engine includes a workflow start control, a workflow end control, a workflow execution control, a multi-programming language conversion engine calling and a task component execution control:

1) Workflow Start Control

The workflow start control is a task control executed by a workflow start node, and is used for controlling initiation of a multi-programming language component workflow, where start rules and start time can be configured, and after the workflow start node is started, the system will automatically create a virtual container required by multi-programming language components, and automatically configure optimal CPU and GPU parameters according to hardware conditions.

2) Workflow End Control

The workflow end control is a task control executed by a workflow end node, and is used for controlling the end of a multi-programming language hybrid workflow and recycling of the virtual container. When the workflow task executes node control, the system will automatically recycle virtual container created by the multi-programming language components, and release a hard disk, memory and CPU resources.

3) Workflow Execution Control

Workflow execution modes include a serial mode and a parallel mode. The serial mode executes connected nodes in sequence. In the parallel mode, nodes at a same branch can be executed simultaneously. When the workflow has a plurality of lines (there are merging nodes, diverging nodes, and diverging and merging nodes), the workflow can simultaneously execute each branch in parallel according to the execution logic, but cannot simultaneously execute the branches in sequence. When executing different programming language nodes, the workflow runs in parallel under different environment controllers, and when executing tasks at a same programming language node, the workflow starts multi-threading mode processing to quickly respond to different execution tasks. During execution, it is ensured that a merging node can be executed only after all entry nodes of the merging node are executed; and execution of each workflow component node is performed by a controller in strict accordance with data input and output specifications, results will be returned upon completion of the execution, and a program then continues to execute the next node.

4) Multi-Programming Language Conversion Engine Calling

Multi-language logical rule determination is the execution determination between circulation flow of workflow nodes and task components, and multi-programming language task components have pre-conditions and post-conditions. Different pre-conditions and post-conditions exist in various data processing and mining analysis scenarios, logical rule determination is added to the workflow, and logical rules are configured on a workflow node connection line; and small data instance pre-tests are performed automatically before the workflow is executed, process performance and efficiency of each component are calculated, and thresholds are set to optimize an execution strategy. Support existence or not, character type, length threshold and expected effect determination, support field type conversion and parameter processing and the like meet unified and standardized processing before and after calling task components, and can support comprehensive mining and analysis of various data in application scenarios in an effective and convenient manner.

5) Task Component Execution Control

Task components are important execution nodes in the multi-programming language hybrid workflow, the same task component can be referenced by multiple flow nodes. Each component has an independent virtual runtime environment for Java language, Python language, R language program and other languages, each component strictly abides by component input rules and output rules, and the system automatically records detailed log information. When the workflow nodes are unable to run normally, the system will capture errors and give feedback on error information through an understandable problem library.

Figure 4:
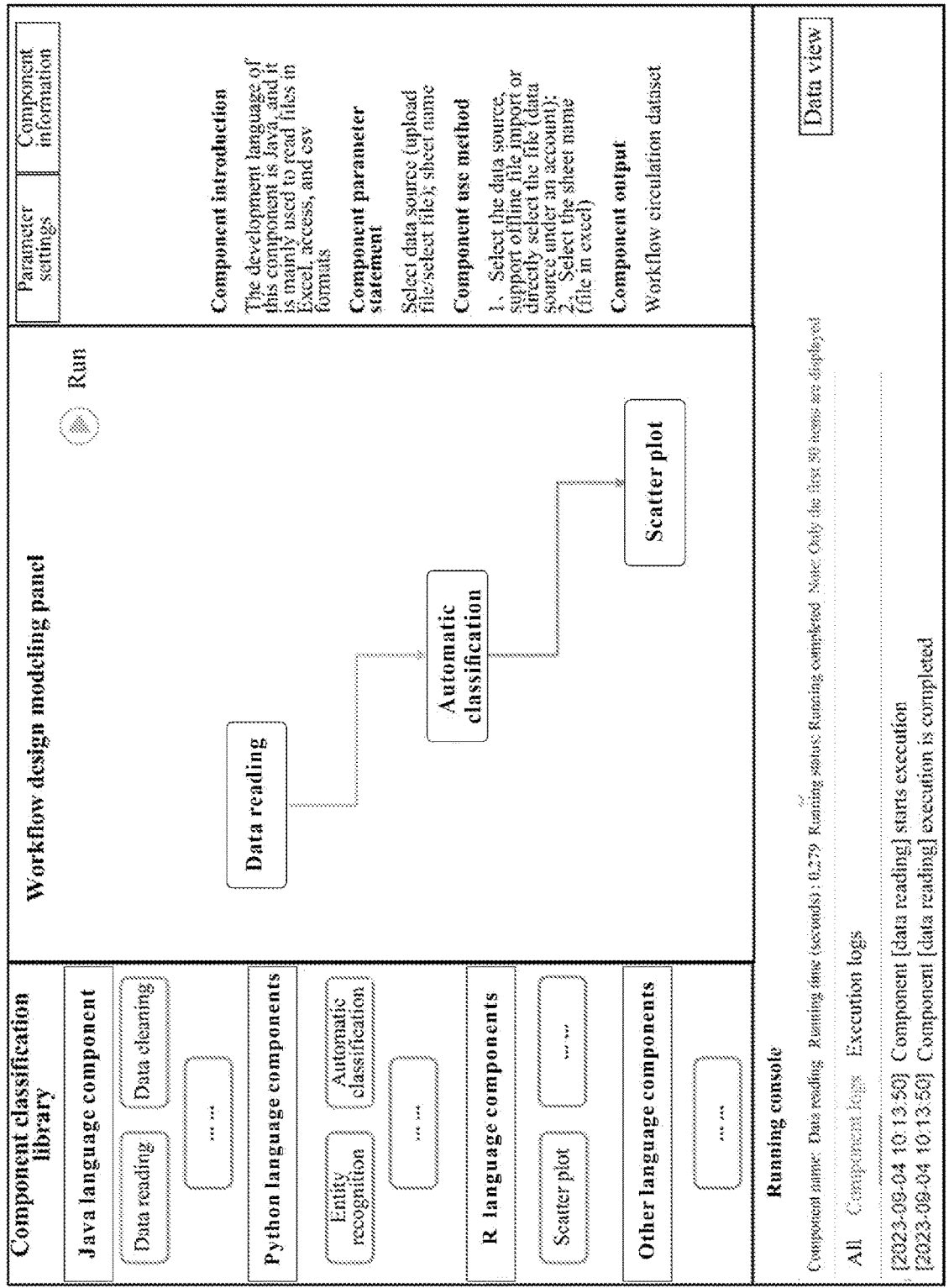
FIG. 4 is a schematic diagram of a multi-language programming component workflow design modeler provided in the present disclosure.

In another aspect, the present disclosure provides a use method of the ontology-based multi-programming language component specifications and workflow system, as shown in FIG. 4, including:

step 1: construct data reading components and data pre-processing analysis components by using Java language, where data reading is a fixed start node; construct machine learning classification algorithm components by using Python language, where the components are all common nodes or diverging and merging nodes; and construct data visualization analysis components by using R language, where the components are all end nodes;

step 2: independently select and taking analysis data as input items, and connect the data reading components, the machine learning classification algorithm components and the data visualization analysis components used in a data preparation process to form a workflow form of multi-language components in serial assembly;

step 3: use a core workflow engine to adjust and acquire a component access sequence, and call a multi-programming language transformation engine to determine and identify allocation, conversion and control of inputted and outputted parameters of the components;

step 4: redefine a data structure of inputted and outputted files of components in different languages in a workflow through the step 3 according to input parameter rules and output parameter rules, and generate a unified data structure and component configuration of multi-programming languages;

step 5: after the unified data structure and component configuration of multi-programming languages are implemented through the core workflow engine, provide a unified calling interface for Java language, Python language, R language and other languages; and step 6: after the processing in the step 5 is completed, the core workflow engine uniformly outputs execution results of the workflow according to the output parameter rules, and feeds back to a workflow result display, such that actual execution results of the workflow formed by combining the multi-programming languages are displayed.

Figure 5:
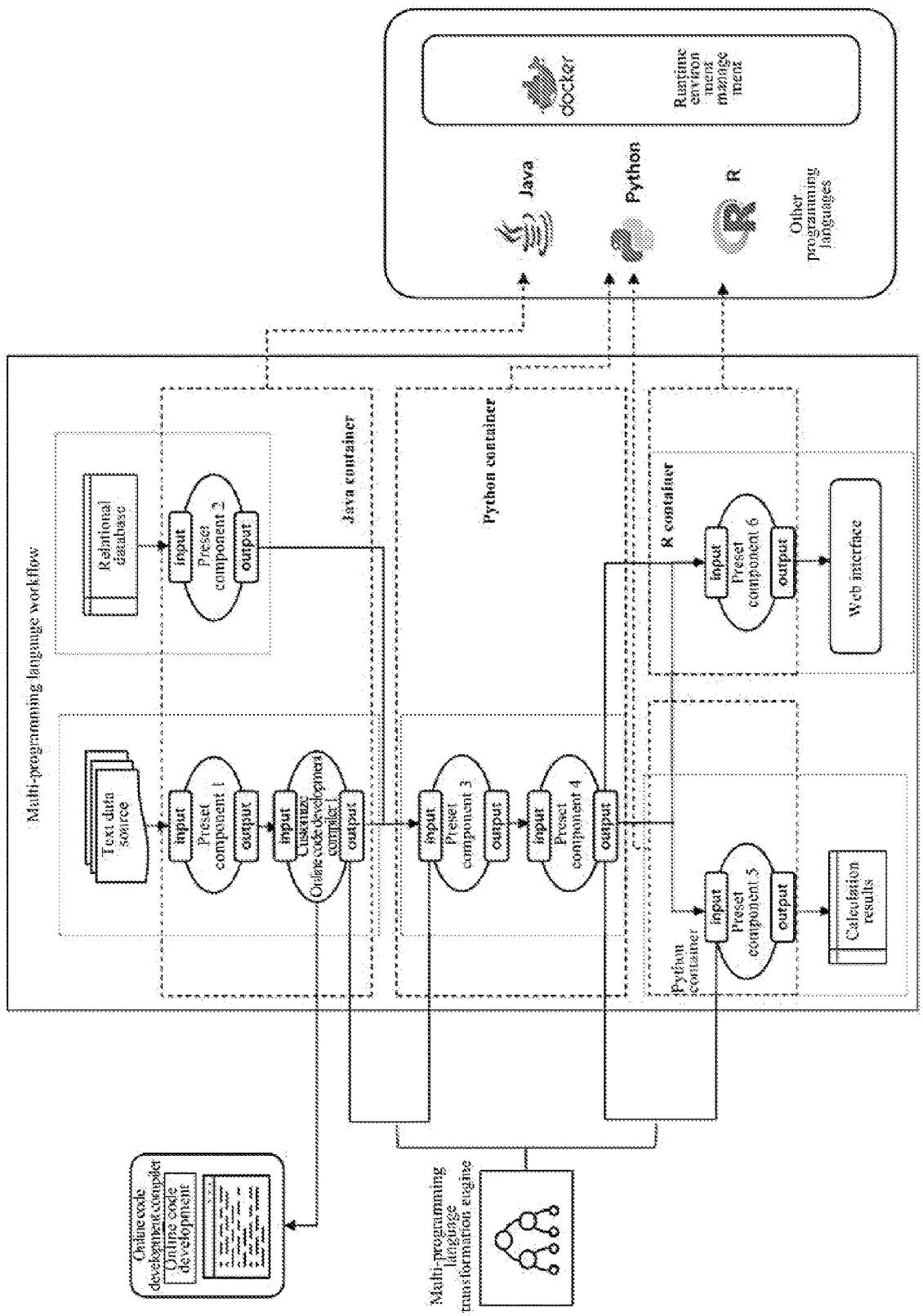
FIG. 5 is a structural schematic diagram of a multi-language programming component workflow provided in the present disclosure.

In a specific embodiment, a hybrid workflow constructed with multi-programming language components enables collaboration, logical control and visual operation of multiple sub-processes to achieve comprehensive management and analysis of data. Taking data collection, storage, analysis and visualization as an example, as shown in FIG. 5, the workflow is composed of three sub-processes, where a sub-process 1 completes data collection and executes the real-time collection task of website data sources in a Java environment container; a component 1 and an online code development compiler 1 execute a structured method for timing collection and data cleaning, where the online code development compiler can customize to write a data cleaning program; and a sub-process 2 reads data from a relational database. A sub-process 3 merges data from two sources and implements the selection of machine learning algorithms and model training, a component 3 is automatically implemented in a Python environment container, the component 3 implements methods such as data set assembly, model training and algorithm accuracy verification, and a component 4 implements real-time analysis of data. The sub-process 4 implements data result statistics and graphical visualization display, which is implemented based on a R language container, a component 5 implements statistical analysis of result processing, and a component 6 implements graphical visualization display through a WEB interface. Data communication in different programming languages is implemented through the multi-programming language transformation engine.

Each embodiment of the description is described in a progressive manner, each embodiment focuses on differences from other embodiments, and the same and similar parts between the embodiments may refer to each other. Since the device disclosed in the embodiments corresponds to the method disclosed in the embodiments, the description is simple, and reference can be made to the method description.

The above description of the disclosed embodiments enables professionals skilled in the art to achieve or use the present disclosure. Various modifications to the embodiments are readily apparent to professionals skilled in the art, and the general principles defined herein may be implemented in other embodiments without departing from the spirit or scope of the present disclosure. Therefore, the present disclosure is not limited to the embodiments shown herein but falls within the widest scope consistent with the principles and novel features disclosed herein.

The invention claimed is:

1. An ontology-based multi-programming language component specifications and workflow system, comprising a central processing unit (CPU), a graphics processing unit (GPU), a memory, a hard disk, a multi-language programming component manager, a multi-language programming component workflow design modeler, a multi-programming language transformation engine and a core workflow engine, wherein the multi-language programming component manager is connected with the multi-language programming component workflow design modeler and the multi-programming language transformation engine; and the core workflow engine is connected with the multi-language programming component workflow design modeler and the multi-programming language transformation engine;

the multi-language programming component manager encapsulates, presets, organizes, manages and stores multi-type and multi-programming language components in a platform; wherein the multi-type and multi-programming language components are codes in different programming languages to implement specific functions;

the multi-language programming component workflow design modeler supports design and construction of a workflow model containing a mixture of the components in different programming languages;

wherein the different programming languages comprises Java language, Python language, and R language; wherein data types in Java language comprises int, long, double, Boolean, char, string, and list; wherein data types in Python language comprises numbers, Boolean, string, and list; wherein data types in R language comprises double, integer, Boolean, char, list;

when performing data communication across components in different programming languages, the multi-programming language transformation engine converts and maps the data types and parameters required by the components of any programming language of the different programming languages to the data types and parameters of another programming language of the different programming languages according to requirements; and the core workflow engine coordinates multiple node tasks of different programming language components and their data dependencies, wherein in the multi-language programming component workflow design modeler, node types available for workflow modeling are defined as follows:

start node: can only be used at a beginning of the workflow, any nodes in front of the start node are not allowed, but nodes can be connected after the start node;

end node: can only be used at an end of the workflow, nodes in front of the end note are allowed, but any nodes after the end node are not allowed;

merging node: an entry is connected to at least two nodes, and an exit is connected to only one node;

diverging node: only one node entry is provided, but at least two nodes are provided as node exits;

diverging and merging node: at least two node entries and node exits are respectively provided; and common node: only one entry node and one exit node are respectively provided, wherein, in the system, data reading components and data preprocessing analysis components are constructed with the Java language, wherein data reading is a fixed start node; machine learning classification algorithm components are constructed with the Python language, wherein the machine learning classification algorithm components are all common nodes or diverging and merging nodes; and data visualization analysis components are constructed with the R language, wherein the data visualization analysis components are all end nodes.

2. The ontology-based multi-programming language component specifications and workflow system according to claim 1, wherein the multi-language programming component manager is further connected with an online code development compiler; and the online code development compiler supports a user to develop and write codes, to re-edit and modify component codes in a well-built workflow assembly, and to support customization of components.

3. The ontology-based multi-programming language component specifications and workflow system according to claim 1, wherein the core workflow engine is further connected with a workflow running manager, and the workflow running manager monitors and manages usage and consumption of resources in real time.

4. The ontology-based multi-programming language component specifications and workflow system according to claim 1, wherein the multi-language programming component workflow design modeler comprises component classification libraries, design modeling panels, parameter configuration windows, running consoles and data views; the component classification libraries contain encapsulated components and perform functional classification; the design modeling panels are visual graphical process model design tools, which support multi-programming language workflow modeling through the design modeling panels, and support creation of workflow nodes by operating the encapsulated components through a drag-and-drop method, and for each component dragged into the design modeling panels, metadata information about corresponding components can be viewed through component information presentation windows; the component information presentation windows and the parameter configuration windows each provides a standardized metadata definition for each component, comprising a component name, a component description, a programming language, a component use method, a component classification, a component version, and a component parameter description; the data views are used to present workflow data sources and data results; and the running consoles present running results, tasks status and log records.

5. The ontology-based multi-programming language component specifications and workflow system according to claim 1, wherein the multi-programming language transformation engine comprises a normalized multi-programming language transformation and component ontology, and the normalized multi-programming language transformation and component ontology is used to define component specifications, and support standardized component creation, component validity check, component instance organization, and component lifecycle management and storage; and the normalized multi-programming language transformation and component ontology comprises programming languages, interface standards, data types, component types, language transformation, data storage, identifiers, online coding, files, states, algorithm models, virtual environments, resource configuration, licenses, and versions; the programming languages are an extensible class of programming languages, comprising Java, R and Python languages; the interface standards are used for component output ranges, input range and filter value; the language transformation involves inputted parameters and outputted parameters; range types are used for normalizing communication data types, comprising but not limited to characters, numbers, Booleans and lists; the resource configuration refers to conditions for running of software and hardware resources; component classification management refers to a classification of component functions in a data science platform, comprising data reading, data preprocessing, text analysis, feature engineering, machine learning models, machine learning training and visualization; the data storage refers to storage of component-related type data; the versions are versions of recorded components; the licenses are maintained to ensure compliance of use of all components; the states are lifecycles of the recorded components, comprising creation, running, encapsulation, release, undoing, updating and deleting; and the identifiers are unique identifications of the recorded components.

6. The ontology-based multi-programming language component specifications and workflow system according to claim 1, wherein the core workflow engine comprises a workflow node scheduling module, a workflow node management module, a workflow instantiation module, a workflow optimization management module, a workflow process control module and a workflow monitoring management module; and the workflow node management module is used for implementing node component management in the workflow model; the workflow node scheduling module is used for loading and scheduling component nodes in a multi-language programming component library according to the workflow model; the workflow instantiation module is mainly used for executing and implementing data tasks according to the workflow model designed and constructed; the workflow process control module is used for implementing startup, execution and end of a workflow according to execution logic and a sequence; the workflow optimization management module is used for generating strategies for optimizing the execution logic during implementation of the workflow; and the workflow monitoring management module is used for implementing log records and monitoring during an operation of the workflow, and monitoring a process status, a task progress and abnormalities of the workflow.

7. The ontology-based multi-programming language component specifications and workflow system according to claim 6, wherein a control over a workflow process by the core workflow engine comprises a workflow start control, a workflow end control, a workflow execution control, a multi-programming language conversion engine calling and a task component execution control;

the workflow start control is a task control executed by a workflow start node, and is used for controlling initiation of a multi-programming language component workflow, wherein start rules and start time can be configured, and after the workflow start node is started, a system will automatically create a virtual container required by multi-programming language components, and automatically configure optimal central processing unit (CPU) and graphics processing unit (GPU) parameters according to hardware conditions;

the workflow end control is a task control executed by a workflow end node, and is used for controlling the end of a multi-programming language hybrid workflow and recycling of the virtual container; when a workflow task executes a control over the workflow end node, the system will automatically recycle the virtual container created by the multi-programming language components, and release a hard disk, memory and CPU resources;

the workflow execution control comprises a serial mode and a parallel mode; the serial mode executes connected nodes in sequence; in the parallel mode, nodes at a same branch can be executed simultaneously; when the workflow has a plurality of lines, the workflow can simultaneously execute each branch in parallel according to the execution logic; when executing different programming language nodes, the workflow runs in parallel under different environment controllers, and when executing tasks at a same programming language node, the workflow starts a multi-threading mode processing to quickly respond to different execution tasks; during execution, it is ensured that a merging node can be executed only after all entry nodes of the merging node are executed; and execution of each workflow component node is performed by a controller in strict accordance with data input and output specifications, results will be returned upon completion of the execution, and a program then continues to execute a next node;

the multi-programming language conversion engine calling is logical rule determination between a circulation flow of workflow nodes and task components, and multi-programming language task components comprise pre-conditions and post-conditions; Different pre-conditions and post-conditions exist in various data processing and mining analysis scenarios, and logical rules are configured on a workflow node connection line; and small data instance pre-tests are performed automatically before the workflow is executed, a process performance and efficiency of each component are calculated, and thresholds are set to optimize an execution strategy; and the task component execution control ensures that each component strictly abides by component input rules and output rules, and the system automatically records detailed log information.

8. A use method of the ontology-based multi-programming language component specifications and workflow system, which is applied to the system described in claim 1, comprising:

step 1: constructing the data reading components and data preprocessing analysis components by using the Java language; constructing the machine learning classification algorithm components by using the Python language; and constructing the data visualization analysis components by using the R language;

step 2: independently selecting and taking analysis data as input items, and connecting the data reading components, the machine learning classification algorithm components and the data visualization analysis components used in a data preparation process to form a workflow form of multi-language components in a serial assembly;

step 3: using the core workflow engine to adjust and acquire a component access sequence, and calling the multi-programming language transformation engine to determine and identify allocation, conversion and control of inputted and outputted parameters of the components;

step 4: redefining a data structure of inputted and outputted files of the components in different languages in a workflow through the step 3 according to input parameter rules and output parameter rules, and generating a unified data structure and a component configuration of multi-programming languages;

step 5: after the unified data structure and the component configuration of the multi-programming languages are implemented through the core workflow engine, providing a unified calling interface for the Java language, the Python language, the R language and other languages; and step 6: after the processing in the step 5 is completed, the core workflow engine uniformly outputs execution results of the workflow according to the output parameter rules, and feeds back to a workflow result display, such that actual execution results of the workflow formed by combining the multi-programming languages are displayed.

* * * * *